(12) United States Patent
Chen et al.

(10) Patent No.: US 8,089,407 B2
(45) Date of Patent: Jan. 3, 2012

(54) SYSTEM AND METHOD FOR MODEL-FREE POSITION ESTIMATION AND TRACKING (75) Inventors: Aiyou Chen, New Providence, NJ (US);
Cristina Laura Harko, Northampton, MA (US); Diane Lambert, Summit, NJ (US); Philip A. Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 1100 days.

(21) Appl. No.: 11/303,140

(22) Filed: Dec. 16, 2005

(65) Prior Publication Data

US 2007/0139269 A1 Jun. 21, 2007

(51) Int. Cl.
*G01S 3/02* (2006.01)
(52) U.S. Cl. ........................................ 342/454
(58) Field of Classification Search .................. 455/456; 342/450, 454

See application file for complete search history.

(56) References Cited

U.S. PATENT DOCUMENTS

| | | | | |
|---|---|---|---|---|
| 6,463,290 | B1* | 10/2002 | Stilp et al. | 455/456.1 |
| 6,556,832 | B1* | 4/2003 | Soliman | 455/456.5 |
| 2004/0180671 | A1* | 9/2004 | Spain, Jr. | 455/456.1 |
| 2005/0020278 | A1* | 1/2005 | Krumm et al. | 455/456.1 |
| 2005/0136845 | A1* | 6/2005 | Masuoka et al. | 455/67.14 |
| 2005/0257748 | A1* | 11/2005 | Kriesel et al. | 119/51.02 |
| 2006/0025142 | A1* | 2/2006 | Hamilton | 455/446 |

* cited by examiner

*Primary Examiner* — Harry Liu
(74) *Attorney, Agent, or Firm* — Hitt Gaines, PC (57) ABSTRACT

A system for, and method of, position estimation of, or tracking, an object. In one embodiment, the system includes: (1) a map generator configured to create, without requiring a propagation model, a mean map for the region and (2) a measurement matching engine associated with the map generator and configured to match received measurements regarding the object to a number of nearest neighboring grid points in the mean map.

16 Claims, 8 Drawing Sheets

SYSTEM AND METHOD FOR MODEL-FREE POSITION ESTIMATION AND TRACKING

TECHNICAL FIELD OF THE INVENTION

The present invention is directed, in general, to position tracking and, more particularly, to a system and method for position tracking, particularly advantageous with respect to indoor premises, that is not required to depend upon either a propagation model for the region at which the tracking takes place or a motion model for the object being tracked.

BACKGROUND OF THE INVENTION

Dynamically estimating the position of a moving person or object, or "tracking," has been the subject of intense study for decades. Tracking people and objects indoors from signal strength measurements has applications as diverse as security monitoring, self-guided museum tours and personalization of communications services. Accurate dynamic tracking in real-time has been elusive, though, because signal propagation in buildings and the paths that people follow are complex.

The widespread deployment of wireless networks in buildings provides an opportunity to estimate the position of people and objects in real-time for emergency response, protection of corporate assets, and personalized, position-based communications. Consequently, many approaches to static position and dynamic tracking from wireless signal strength measurements have been developed, at least in theory. Typically, tracking involves updating static position estimates using a motion model.

Relating received signal strength (RSS) to position is key to estimating the position of either a static or moving object. Several parametric propagation models that describe path loss across a region have been devised, but none has been unequivocally accepted (see, e.g., Molkdar, "Review on Radio Propagation Into and Within Buildings," IEEE Proceedings-H, vol. 138, pp. 61-73, 1991; and Hashemi, "The Indoor Radio Propagation Channel," Proceedings of the IEEE, vol. 81, pp. 943-968, 1993). Many require restrictive assumptions.

The most common models are based on inverse exponent laws: $10 \log_{10} L(d) = \gamma \log_{10} d + L_{ref}$, where d is distance, L(d) is actual path loss and $L_{ref}$ is path loss at a reference distance. Values for $\gamma$ range from about 1.5 to 5 depending on channel conditions, such as whether the target position is line-of-sight down a corridor or whether the transmitter and receiver are on adjacent floors (see, e.g., Rappaport, et al., "UHF Fading in Factories," IEEE Journal Selected Area of Communications, vol. 7, pp. 40-48, 1989; Rappaport, "Indoor Radio Communications for Factories of the Subsequent," IEEE Communications Magazine, pp. 15-24, May 1989; Saleh, et al., "A Statistical Model for Indoor Multipath Propagation," IEEE Journal Selected Area of Communications, vol. 5, pp. 128-137, 1987; Hashemi, supra; and references therein). There can also be additional log-normal shadowing loss with a standard deviation ranging from 3 decibels (dB) to 15 dB that affects RSS readings (id.). All these sources of variation need to be modeled for position estimation and tracking based on a propagation model to be effective.

More ambitious propagation models do not rely solely on distance but also include the loss incurred from walls, floors, partitions and other obstacles that may lie between the transmitter and the receiver. Path loss can then be determined by adding up attenuation estimates for the various obstacles (see, e.g., Seidel, et al., "900 MHz Path Loss and Prediction Techniques for In Building Communications System Designs," Proceedings 41st Vehicular Technology Conference, St. Louis Mo., VTC 91, 1991). In practice, however, these extended path loss models offer little improvement over exponent models.

Including detailed information about the composition of the walls, floors and other structures in the building can help, but this information is difficult to obtain. Moreover, even sophisticated ray-tracing models that take detailed building maps and materials into account, such as the well-known WISE software tool (see, e.g., Fortune, et al., "WISE Design of Indoor Wireless Systems: Practical Computation and Optimization," IEEE Computational Science and Engineering, vol. 2, pp. 58-68), have typical errors of 6 dB, which is far too high for accurate tracking. These tools may however be used in planning out the position and number of access points (APs) as well as the distribution of training positions.

Nonetheless, some position estimation algorithms have been based on path loss models (see, e.g., Chen, et al., "Signal Strength Based Indoor Geoposition," Proceedings IEEE Conference on Communications, New York, 2002). The parameters of the path loss model may be estimated from a set of training data with known positions using a regression model that includes wall attenuation and a path loss exponent. Position estimates are then based on the fitted model.

Several approaches to indoor tracking have avoided path loss models and instead drawn an empirical mean RSS map for each of a set of $N_{AP}$ APs by interpolating the mean RSSs obtained at a set of known training positions. RSS measurements at an unknown position are then compared to the RSS maps to estimate the receiver's position. Because there is no path loss model, the positions of the APs need not be known, and indeed are not used in any way.

Some systems require training measurements to be constantly generated by transceivers, called "emitters," at fixed positions (see, e.g., Krishnan, et al. "A System for LEASE: System Position Estimation Assisted by Stationary Emitters for Indoor RF Wireless Networks," In Proceedings of IEEE Infocom, 2004). The emitters allow the current propagation environment, which depends on factors that change over time, such as building occupancy, to be re-estimated routinely. A signal strength mean map is estimated by fitting a nonparametric smooth function to the training data using the coordinates of their positions as the covariates in the fitted model. To estimate a position, the J strongest RSS readings may be compared to the corresponding J smoothed RSS maps, ignoring the $N_{AP} - J$ weaker signals. The position of the nearest neighbor using Euclidean distance is declared to be the estimated position.

Perhaps the most well-known algorithm for tracking is the Kalman filter, which has been used for indoor tracking in, e.g., Guvenc, et al., "Enhancements to RSS Based Indoor Tracking Systems Using Kalman Filters," International Signal Processing Conference and Global Signal Processing Expo, Dallas, Tex., 2003, and Fox, et al., "Bayesian Techniques for Position Estimation," IEEE Pervasive Computing, vol. 2, no. 3, 2003, for example. Kalman filters are based on linear motion. Unfortunately, people often do not take linear paths indoors because doors, walls and corners frequently interfere with them. Particle filters have sometimes been used, but their computations are burdensome and not suited to online tracking.

Voronoi filters that restrict movement to a graph that by design prohibits wall crossing have also been used (see, e.g., Liao, et al., "Voronoi Tracking: Position Estimation Using Sparse and Noisy Sensor Data," Proceedings of the International Conference on Intelligent Robots and Systems," IEEE/

RSJ, 2003). This procedure can be more accurate, but it also requires significantly more computation.

Round-trip delay (see, e.g., Low, et al., "Pulse Detection Algorithm for Line-of-Sight (LOS) UWB Ranging Applications," IEEE Antennas and Propagation Letters, vol. 4, pp. 63-67, 2004) has been used to estimate position and is potentially far more accurate than techniques based on signal strength, but it requires high bandwidth (ultra wideband) signals and specialized hardware. For example, ranging involves detecting the return pulse reflected from a passive device on the target and measuring the round trip delay. For line-of-sight positions, this method can achieve centimeter accuracy over distances of about 20 m (id.).

All of the aforementioned approaches suffer from extensive training, undue computational complexity, inadequate positional accuracy or a combination of these. What is needed in the art is a simple, system and method for performing dynamic tracking that performs well with limited training data. More specifically, what is needed in the art is a system and method that is not required to depend upon either a propagation model or a motion model of the region in which the tracking takes place.

SUMMARY OF THE INVENTION

To address the above-discussed deficiencies of the prior art, the present invention provides, in one aspect, a system for position estimation of an object relative to a region. In one embodiment, the system includes: (1) a map generator configured to create, without requiring a propagation model, a mean map for the region and (2) a measurement matching engine associated with the map generator and configured to match received measurements regarding the object to a number (e.g., k) of nearest neighboring grid points in the mean map.

In another aspect, the present invention provides a method of position tracking an object relative to a region. In one embodiment, the method includes: (1) creating, without requiring a propagation model, a mean map for the region and (2) matching received measurements regarding the object to a number (e.g., k) of nearest neighboring grid points in the mean map.

The foregoing has outlined preferred and alternative features so that those skilled in the pertinent art may better understand the detailed description that follows. Additional features will be described hereinafter that form the subject of the claims. Those skilled in the pertinent art should appreciate that they can readily use the disclosed conception and specific embodiment as a basis for designing or modifying other structures for carrying out the same purposes. Those skilled in the pertinent art should also realize that such equivalent constructions do not depart from the spirit and scope of the present invention.

BRIEF DESCRIPTION OF THE DRAWINGS

For a more complete understanding of the invention, reference is now made to the following descriptions taken in conjunction with the accompanying drawing, in which.

DETAILED DESCRIPTION

The position tracking system disclosed herein is appropriate for use with any region or premises: outdoor, indoor or a combination of outdoor and indoor. However, as has been described, indoor premises have more complex radio frequency propagation characteristics, making position and tracking more difficult. Therefore, the position tracking system described herein finds particularly advantageous use in indoor premises. The region may be of any size or shape and may have any plural number of associated APs. If the region has more than one floor, the APs may be on any one or combination of floors.

Various embodiments of a straightforward algorithm contained within a system or carried out in a method for position tracking will be described. The described embodiments require neither a propagation model to determine position nor a motion model to track movement. The algorithm is also relatively simple to compute; many embodiments require only conventional tools for performing Delaunay triangulation, linear interpolation, moving averaging and local regression. Experiments with real data and simulations based on real data will also be set forth below. The experiments will show that the embodiment of the algorithm that is the subject of the experiment is effective.

Figure 1:
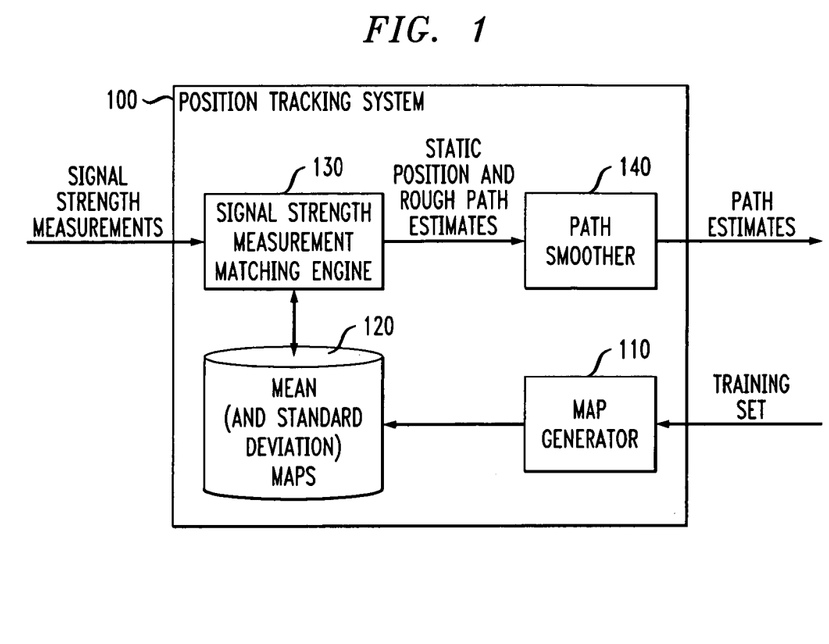
FIG. 1 illustrates a block diagram of one embodiment of a position estimation or tracking system constructed according to the principles of the present invention.

Referring initially to FIG. 1, illustrated is a block diagram of one embodiment of a position tracking system constructed according to the principles of the present invention. The illustrated embodiment of the indoor position tracking system is generally designated 100 and includes a map generator 110, a mean (and standard deviation) maps database 120, a signal strength measurement matching engine 130 and a path smoother 140.

Before proceeding, it should be noted that the embodiments described in this Detailed Description happen to be based on signal strength. While signal strength is certainly an basis on which position estimates can be made, the present invention is not limited to estimating position or tracking based on signal strength. To the contrary, the present invention fully encompasses round trip delay or any other information a receiver, such as an AP, can provide that can form a basis upon which the position or movement of an object can be determined.

The map generator 110 is configured to create, without requiring a propagation model, a signal strength mean map for the particular region. In one specific embodiment, a regular grid of points is used to represent the floor of the region. Using the average of the signal strength values obtained through training or in existence as described above, the mean signal strength at each grid point is determined by interpolation for each AP in turn. The result is a signal strength mean map in which a vector is associated with every grid point, each vector having a number of components that equals the number of APs.

The term "AP" is broadly defined to include any radio transceiver capable of providing signal strength measurements and includes, for example, base stations in cellular telecommunication networks.

The map generator 110 may also be configured to create, without requiring a propagation model, a signal strength standard deviation map for the region. In the specific embodiment described immediately above, the signal strength standard deviation map is constructed like the signal strength mean map, except that standard deviations are used instead of means.

The map generator 110 may create the maps through a training process or may simply compile preexisting training data into maps. The mean (and, optionally, standard deviation) maps are stored in the mean (and standard deviation) maps database 120.

The signal strength measurement matching engine 130 is associated with the map generator 110 and is configured to match signal strength measurements regarding the object to a number (e.g., k) of nearest neighboring grid points in the mean map.

"Nearest," as the term is used herein, is based on the distance between (1) a vector composed of signal strength measurements regarding a given object made by multiple APs and (2) vectors corresponding to grid points in the signal strength mean map. Thus, "nearest" is in terms of signal strength, not physical distance. Typically, the distance is a Euclidean distance, but other measures of distance fall within the broad scope of the present invention. Also, those skilled in the art should understand that "nearest" may be expressed in terms of round trip delay, if such is the basis upon which maps are created.

The means of the k-nearest neighboring grid points taken from the signal strength mean map are then averaged to yield a static position estimate for the object.

In one embodiment, the signal strength measurement matching engine 130 is also configured to employ a signal strength standard deviation map to produce the static position estimate. In such case, the average of the means of the k-nearest neighboring grid points taken from the signal strength mean map is weighted based on standard deviations associated with the k-nearest neighboring grid points taken from the signal strength standard deviation map to yield the static position estimate for the object. As FIG. 1 shows, the signal strength measurement matching engine 130 produces at least static position estimates, and perhaps also rough path estimates, assuming that one wants to track the movement of an object and not just determine its static position.

The path smoother 140 is associated with the signal strength measurement matching engine 130 and is configured to make smooth, without requiring a motion model, the static position estimates regarding the object to form smooth path estimates.

The specific embodiment of the map generator 110 operates as follows. For each of $N_{AP}$ APs, the mean received signal strength (RSS) is mapped across the region by linearly interpolating sample means over a triangular partition of the space, ignoring height. In a more specific embodiment, the map generator 110 further operates to map the standard deviation of RSS by linearly interpolating an estimate of standard deviation over the same triangles. The resulting signal strength mean map and, optionally, the resulting signal strength standard deviation map are stored in the mean (and standard deviation) maps database 120. It should be noted, however, that the present invention can use preexisting training data and is not restricted to triangular partitioning or linear interpolation. Other partitioning and interpolation techniques fall within its broad scope.

The specific embodiment of the signal strength measurement matching engine 130 operates as follows. Signal strength is estimated at the current position by taking a moving average of the m most recent RSS measurements. Then, the k-nearest grid point neighbors of this average are found using the $N_{AP}$-dimensional signal strength mean map. Then, a weighted average is taken of their corresponding k positions, the weights being based on the signal strength standard deviation map. With Gaussian weights, this estimate approximates a Bayes estimate of position for a uniform prior density on position, Gaussian RSS measurements and squared error loss. By this process, the illustrated embodiment of the signal strength measurement matching engine 130 produces a stream of static position and rough path estimates. Rough path estimates are paths made up by joining static positions with line segments; they are typically jagged and not smooth.

The specific embodiment of the path smoother 140 operates as follows. The moving average position estimates are made smooth using locally linear regression. Locally linear regression is known (see, e.g., Cleveland, et al., "Locally Weighted Regression: An approach to Regression Analysis by Local Fitting," J. Amer. Stat. Assoc., vol. 12, pp. 596-610, 1988, incorporated herein by reference). Loess smoothing is one type of locally linear regression and is employed in some embodiments of the present invention. Making the moving average position estimates smooth using locally linear regression increases the stability of the estimated path, and as a result decreases wall crossings. Path smoothing is not present in all embodiments of the present invention and may be performed by a variety of conventional techniques known to those skilled in the pertinent art.

Figure 2:
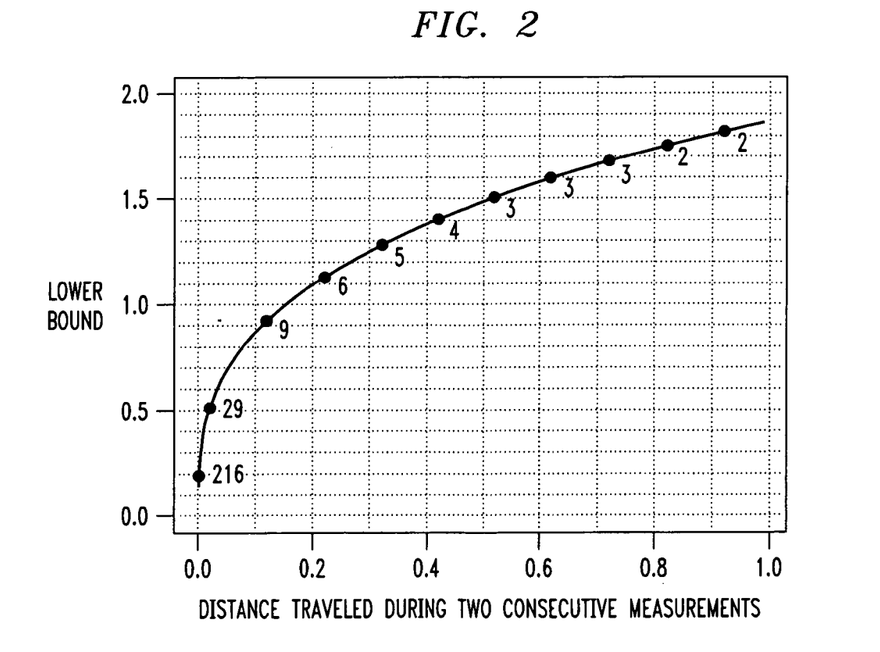
FIG. 2 illustrates an exemplary graphical representation of the square root of the mean squared error ($\sqrt{MSE}$) as a function of distance traveled between two consecutive measurements when $\alpha=0.75$ and $\sigma=3$ dB.

In the illustrated embodiment, mapping is done offline, and position estimation and tracking are done online whenever RSS measurements for the tracked object become available. FIG. 2, described below, particularly illustrates this division.

In certain embodiments described herein, tracking involves only Delaunay triangulation of the region, linear interpolation over triangles, determination of k-nearest neighboring grid points, weighted averaging, moving averaging and locally linear smoothing. Well-known, fast algorithms exist for all of these procedures (see, e.g., Fortune, "Voronoi Diagrams and Delaunay Triangulations," *CRC Handbook of Discrete and Computational Geometry*, pp. 377-388, 1997, for Delaunay triangulation; Clarkson, "Nearest Neighbor Queries in Metric Spaces," *Discrete Comput. Geom.*, vol. 22, pp. 63-93, 1999, and Fortune, et al., "A Note on Rabin's Nearest Neighbor Algorithm," Information Processing Letters, vol. 8, pp. 20-23, 1979 for k-nearest neighboring grid points; and Cleveland, et al., "Locally-Weighted Regression: An Approach to Regression Analysis by Local Fitting," Journal of the American Statistical Association, vol. 12, pp. 596-610, 1988, and Cleveland, et al., "Computational Methods for Local Fitting," Statistics and Computing, vol. 12, pp. 47-62, 1991, for locally linear smoothing, all of which being incorporated herein by reference).

Rough guidelines will be provided below for choosing the number of nearest neighboring grid points and the window of the moving average. It will be shown that static position estimation may be carried out to great advantage by taking many neighbors, as many as 100, and weighting them probabilistically.

The illustrated embodiment of the map generator 110 creates a purely empirical signal strength mean map by partitioning the region ("floor space," ignoring height) with Delaunay triangulation and then applying triangle-based linear interpolation to the sample mean RSS at a set of training positions.

The illustrated embodiment of the signal strength measurement matching engine 130 estimates a position by finding its nearest neighboring grid points in the set of empirical maps for substantially all APs, and not just the maps corresponding to the J strongest signals at the position. Further, the average of k nearest neighboring grid points is used to estimate position. Again, k may be many dozens, if not more, closest neighbors. A heuristic for choosing k will be described below.

The illustrated embodiment of the signal strength measurement matching engine 130 estimates a position by using Gaussian weights with means and standard deviations taken from the maps of the means and standard deviations of signal strengths. This probabilistic weighting gives a Bayes estimate of position for squared error loss when the prior distribution is uniform across the map and RSS measurements have normal distributions.

Map Generation by One Embodiment of the Map Generator 110.

The sample mean $\hat{\mu}(x,y)=\bar{R}(x,y)$ of RSS measurements from an AP are computed at each position (x,y) in a training set. To take into account changing variability over the region, the mean and standard deviation (MAD) estimate of the standard deviation $\hat{\sigma}(x,y)=1.4826 \cdot \text{median}|R-\text{median}(R)|$ at each training position is also computed. $\hat{\sigma}$ may alternatively be estimated from RSS measurements taken during tracking.

The factor 1.4826 is chosen so that the MAD is an unbiased estimate of the standard deviation for Gaussian measurements. The MAD estimate is used because it is known to be robust against outliers and non-normality. Empirical mean and standard deviation maps for each AP are obtained by linearly interpolating the sample means and MAD estimates over Delaunay triangles (see, e.g., Fortune, supra).

Static Position Estimation by One Embodiment of the Signal Strength Measurement Matching Engine 130.

The number of nearest neighboring grid points, k, is based on an uncertainty in a static position estimate. An unknown position is estimated by finding the k-nearest neighboring grid points in the empirical mean maps $\{\hat{\mu}_i(x,y)\}$ for $i=1,\ldots,N_{AP}$ to the observed vector of RSS $R=(R_1,\ldots,R_{N_{AP}})$. If the j-nearest neighbor $(x_j,y_j)$ has an estimated mean $(\hat{\mu}_{j1},\ldots,\hat{\mu}_{jN_{AP}})$ and an estimated standard deviation $(\hat{\sigma}_{j1},\ldots,\hat{\sigma}_{jN_{AP}})$, it is assigned a weight, e.g.:

$$w_j = \prod_{i=1}^{N_{AP}} (\sqrt{2\pi}\,\hat{\sigma}_{ji})^{-1} \exp(-(Ri-\hat{\mu}_{ji})^2(2\hat{\sigma}_{ji}^2)^{-1}).$$

The particular weight given in this equation is the Gaussian probability density function evaluated at R. Given n test measurements at the unknown position, the average measurement is used for finding the k-nearest neighboring grid points. Each $w_j$ is the product of the n Gaussian probability densities evaluated at the n test measurements respectively. The estimated position (x,y) is defined to be the weighted average:

$$\left( \frac{\sum_{j=1}^{k} w_j x_j}{\sum_{j=1}^{k} w_j}, \frac{\sum_{j=1}^{k} w_j y_j}{\sum_{j=1}^{k} w_j} \right).$$

Conventionally, only a few nearest neighboring grid points, e.g., 1, 2 or 3, and uniform weights have been used, but using a much larger k with Gaussian weights can yield significantly better results. For example, using Gaussian weights over the entire mean map gives an approximate posterior mean for the unknown position when the RSS measurements are normally distributed with a common variance and the prior mean is uniform (see, e.g., Roos, et al., "A Statistical Modeling Approach to Position Estimation," IEEE Transactions on Mobile Computing, vol. 1, no. 1, January-March 2002). The RSS measurements do not have a common variance, so the portion of the map used to estimate the position should be large enough to capture a large fraction of the posterior distribution but not so large as to include many positions with very different distributions of RSS.

Roughly, if the unknown position is estimated from the sample mean of n test measurements from the unknown position, its estimated standard error is about $\hat{\sigma}/\sqrt{n}$, where $\hat{\sigma}$ is an average, possibly weighted, of the standard deviation estimates across positions. The uncertainty interval should contain at least one standard error centered at the position corresponding to the sample mean at the test position. Thus, k should be approximately the number of grid points that lie in a circle of radius $\alpha\hat{\sigma}/\sqrt{n}$, where $\alpha$ is the error in distance caused by a 1 dB shift in RSS. When the grid points for a mean map are a distance d apart, it is implied that:

$$k \approx \frac{\pi a^2 \hat{\sigma}^2}{nd^2} \qquad (1)$$

In the experiments analyzed in Section 5, which have four APs, $\alpha$ is less than 1. In fact, $\alpha=0.75$. Furthermore, a threshold, $w_{thresh}=(\sqrt{2\pi}\hat{\sigma})^{-nN_{AP}} \exp(-0.5nN_{AP})$, is used to exclude neighbors with weights less than w.

Model-free Online Tracking by One Embodiment of the Signal Strength Measurement Matching Engine 130.

Linear motion models work well when the trajectory is simple, but not when people stop, turn, reverse direction, and change speeds abruptly, as they do indoors. On the other hand, most paths are at least locally smooth. Thus, some embodiments of the present invention assume with good reason that the path itself is locally linear, with the linear coefficients changing over time. It is important to note that the RSS measurements along a locally linear path need not have a locally linear mean, because indoor propagation is complex.

Thus, at every RSS reading, the path is updated in two steps. It is assumed that the mean and standard deviation of RSS readings are roughly constant over short paths, so the current position is first estimated from an average, possibly weighted, of RSS measurements over the recent past using the weighted k-nearest neighbor method described above. It is then assumed that the motion path is locally linear over longer time spans, which allows a smooth, locally linear model to be fitted to a longer segment of the estimated positions in the path obtained so far. Note that the order of operations affects the outcome; the moving average controls for the variability in RSS measurements and the smoothing imposes regularity on the path. These two steps will now be described.

Constant Position Estimation by One Embodiment of the Signal Strength Measurement Matching Engine 130.

If the target moves slowly relative to the rate at which the RSS measurements are taken, the mean signal strength on its path should be roughly constant for short time spans. Thus, recent RSS measurements, not just the current RSS measurement alone, provide reasonable estimates of the current position. Since averaging RSS measurements reduces their variance, computing a position estimate for an average RSS, possibly weighted, over a short time span should give more stable position estimates without incurring much bias. Therefore, to estimate the position at a time t at which an RSS measurement is taken:

(1) the average R of the m most recent RSS measurements is computed, and (2) the weighted average of the positions of the k-nearest neighboring grid points of R in the empirical signal strength mean map is found as described above.

The position estimate therefore corresponds to a moving average of RSS measurements within a short window or span.

The bias introduced by using past RSS measurements in the moving average when the target is not stationary may be reduced by delayed tracking. That is, to estimate the position at time t, one may consider not only m past and current measurements, but also n subsequent measurements. The delay in tracking that results from using n subsequent measurements may be acceptable if n is small and RSS readings are obtained frequently.

The optimal choice of m minimizes the mean squared error (MSE) in estimated position, which depends on the variance $\sigma^2$ in RSS measurements and the distance traveled over m measurements. If the moving average uses only the current and past measurements (no subsequent measurements) and the distance v between two adjacent RSS measurements is constant, the average distance of the sites of the measurements from the current position is mv/2. The MSE in the estimate of the current position is then:

$$MSE = variance + bias^2 = \alpha^2\sigma^2/m + m^2v^2/4,$$

where $\alpha$ is the average change in distance that results from a 1 dB shift in RSS, as described above. The above equation shows that (1) the variance of the error decreases linearly with 1/m and (2) the bias term increases linearly with m. If $\sigma$ and v are roughly constant over the m measurements, the root MSE (RMSE) is minimized at $1.09 \cdot (\alpha^2\sigma^2 v)^{1/3}$ by taking $$m \approx \left(\frac{\sqrt{2}\, a\sigma}{v}\right)^{2/3}.$$

For example, suppose $\alpha=0.75$, the RSS measurements are received every 0.3 seconds, $\sigma$ is about 3 dB along the recent path, and the velocity is about 1 meters per second (m/sec) (i.e., v=0.3 m).

Turning now to FIG. 2, illustrated is an exemplary graphical representation of RMSE as a function of distance traveled between two consecutive measurements when $\alpha=0.75$ and $\sigma=3$ dB. FIG. 2 shows how the minimal RMSE and the optimal m depend on velocity. The solid line shows a cube-root-law fit to the data; the numbers beside the solid points show the optimal m for that velocity. If at least one of the m RSS measurements is a subsequent measurement (a measurement taken ahead of the current position), the bias is reduced and the total number of measurements in the moving average can be larger than Equation (2) implies.

Locally Linear Motion

Computing a position estimate from a moving average of RSS measurements amounts to assuming that the target does not move over short time intervals. These estimates can be used to track a moving target, but they are likely to be noisy because they are based on only a few measurements. (Otherwise, the assumption that the target is not moving might be inadequate.) To make use of older past information, a motion model may be assumed. In the illustrated embodiment, it will be assumed that the path is locally linear, allowing the well-known loess regression model (see, e.g., Cleveland, et al., "Locally-Weighted Regression . . . ," supra; and, Cleveland, et al., "Computational Methods . . . ," supra) to be used, e.g., to make the path smooth.

As those skilled in the pertinent art understand, the general form of the loess regression model is:

$$x_i = g(t_i) + \epsilon_i, i=1,\ldots,n,$$

where g is an unknown, locally linear regression curve and the $\epsilon_i$ are independent, constant variance Gaussian errors. The assumption of constant variance is approximately true over time spans that are not too large relative to the rate at which the target is moving. The loess model is fit by iteratively re-weighted least squares over a span (e.g., 40) of nearest neighboring grid points, where the weight on $(t_i, x_i)$ depends on the distance of the fitted value $(t_i, \hat{x}_i)$ from the observed (see, Cleveland, et) al., "Locally-Weighted Regression . . . ," supra, for a detailed explanation of loess smoothing.) Because only a short delay in prediction is desirable in tracking, many more times $t_i$ are typically to the left of t than to the right of t in the span of t. A fast algorithm for fitting a loess model can be found in Cleveland, et al., "Computational Methods . . . ," supra, and is available in R, a well-known, publicly available, open-source system for statistical computations and graphics (see, e.g., http://cran.r-project.org). Not only is loess smoothing capable of being carried out without an exact motion model, it is also robust to outliers and is not adversely affected by long-tailed, non-Gaussian distributions.

Finally, isolated measurements may occur at the limit of detection (about −90 dB in the data set forth below). While the previous and subsequent measurements are not close to the limit of detection, the current measurement is. Several explanations may exist for these outliers, such as passing obstacles, but in any case spurious "missing" readings may be corrected by replacing each measurement at the limit of detection by the average of the previous two measurements, and then proceeding as if the replacement were the true reading. Replacement by the mean is not optimal, but is relatively easy to implement. Replacement with a random draw from a normal distribution would probably produce better results.

Figure 3:
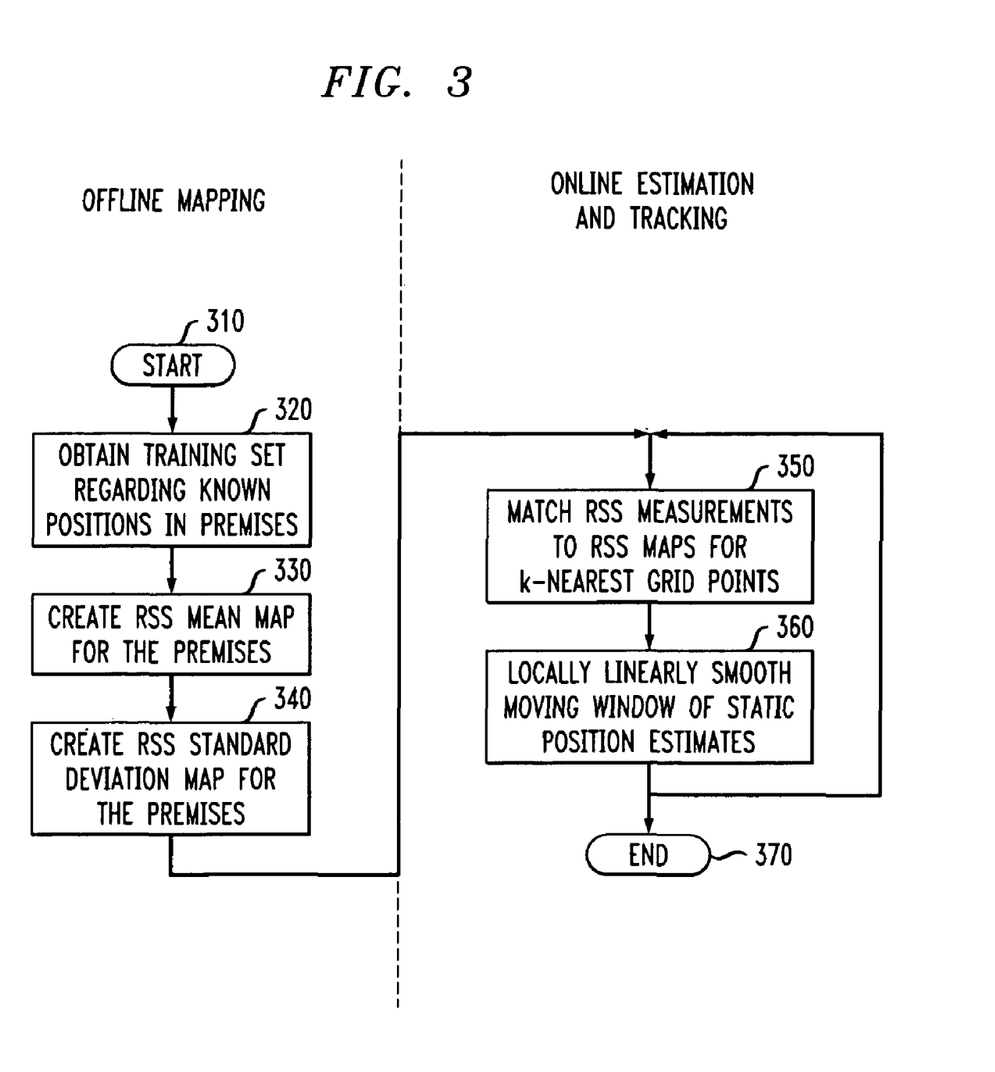
FIG. 3 illustrates a flow diagram of one embodiment of a method of position estimation or tracking constructed according to the principles of the present invention.

Turning now to FIG. 3, illustrated is a flow diagram of one embodiment of a method of position estimation or tracking constructed according to the principles of the present invention. The method begins in a start step 310 wherein it is desired to estimate the position of, or track the movement of, objects relative to a particular region.

In a step 320, a training set of RSS measurements is taken from known positions in the region. In a step 330, RSS mean maps for the region are created. In a step 340, RSS standard deviation maps for the region are also created. As FIG. 3 indicates, the steps 310, 320, 330, 340 are advantageously performed offline and a priori. Creating may simply involve loading a database with preexisting training data pertaining to the premises.

At this point, the method is advantageously performed online or in real time. In a step 350, RSS measurements are matched to RSS mean maps and perhaps RSS standard deviation maps for the k-nearest neighboring grid points. This yields one or more position estimations. In a step 360, a moving window of static position estimates is locally linearly smoothed to provide tracking. The method ends in an end step 370. A more specific embodiment of a dynamic tracking algorithm will now be described.

For a nearest neighboring grid points span k, a moving averaging span m, (including n forward RSS measurements), loess spans of s and r past and subsequent estimated positions, the specific embodiment of the dynamic tracking algorithm has the following steps.

1. For a set of training data with $N_{AP}$ APs,
   (a) For each AP, create an empirical propagation model by triangle based linear interpolation of sample means of RSS.
   (b) For each AP, create an empirical map of the standard deviation of RSS by triangle-based linear interpolation of MAD estimates.
2. For t=1, 2, . . . , given an $N_{AP}$-dimensional vector of RSS measurements $R_t$,
   (a) If $R_t$ is at the limit of detection, replace $R_t$ with the average of the two previous measurements.
   (b) Compute the moving average maR(t) of $R_{t-m+1}, \ldots, R_{t+n}$.
   (c) Estimate the position $(\hat{x}_t, \hat{y}_t)$ of maR(t) by finding the Gaussian-weighed average of the positions of its k-nearest neighboring grid points in the empirical signal strength mean map.
   (d) Fit a loess model to $(\hat{x}_{t-s+1}, \ldots, \hat{x}_{t+r})$ to estimate $\hat{X}_t$.
   (e) Fit a loess model to $(\hat{y}_{t-s+1}, \ldots, \hat{y}_{t+r})$ to estimate $\hat{Y}_t$.
   (f) Return $(\hat{X}_t, \hat{Y}_t)$ as the estimated position at time t.

The first major step constitutes training and can be computed offline and a priori; the second major step defines tracking and can be computed online and in real time. The final positions $\{(\hat{X}_t, \hat{Y}_t)\}$ are smooth with respect to t and serve as the estimated moving path. It would be preferable, but more complicated, to make the bi-variate $(x_t, y_t)$ smooth in one step, taking into account the correlation in the two dimensions. This may further reduce wall-crossings.

Figure 4A:
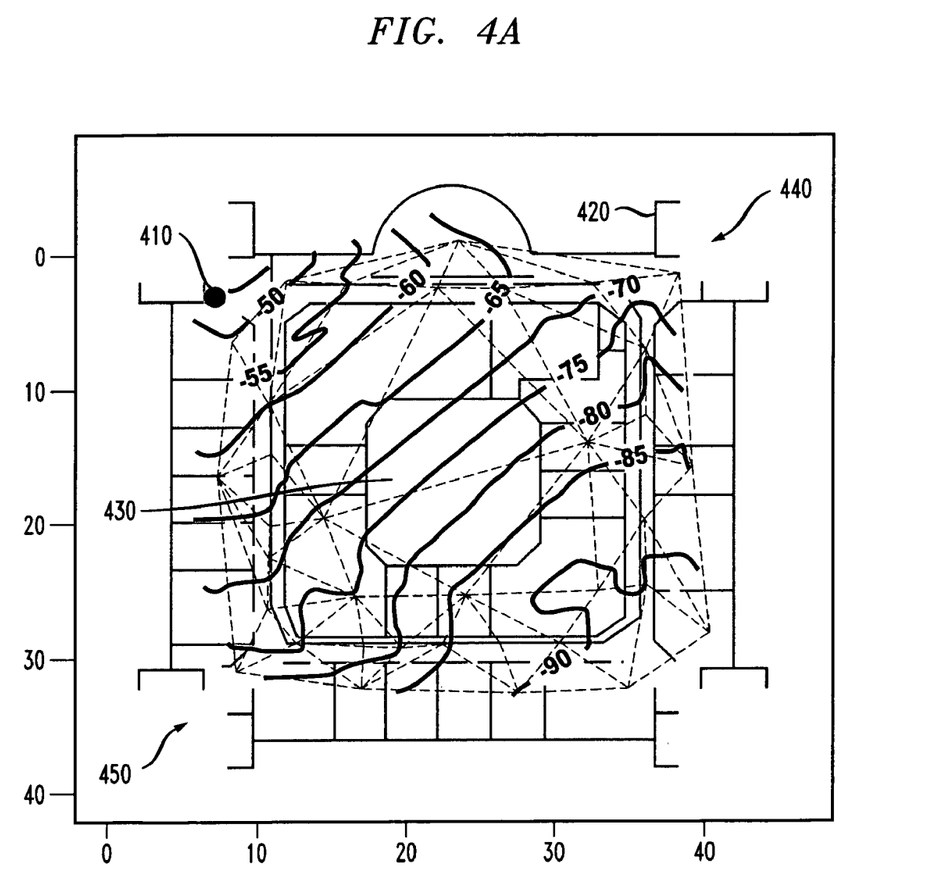
FIGS. 4A and 4B together illustrate exemplary graphical representations of contours of the estimated mean signal strength and estimated standard deviation of signal strength for one AP for a particular set of sample data.
Figure 4B:
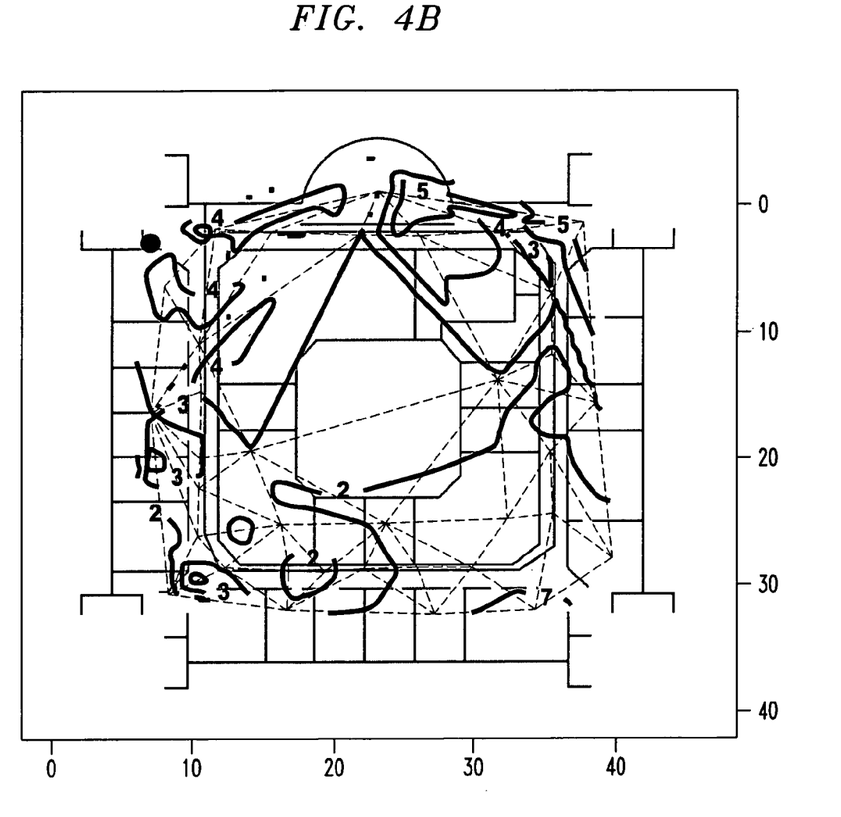

Turning now to FIGS. 4A and 4B, together are illustrated exemplary graphical representations of contours of the estimated mean signal strength and estimated standard deviation of signal strength for one AP 410. Solid lines in the background indicate a building map 420; a closed circle indicates the AP 410, which is located in the northwest stairwell as FIGS. 4A and 4B are oriented. The dotted lines show the Delaunay triangulation based on 30 training positions. As a starting point, sample wifi path data set forth in Evennou, et al., "Map-Aided Indoor Mobile Positioning System Using Particle Filter," IEEE Wireless Communications and Networking Conference, New Orleans, La., March 2005 (incorporated herein by reference), will be used.

Evennou, et al., obtained about 100 RSS measurements from four APs at each of 88 positions in a space of about 35 m×40 m that includes corridors and offices around a walled central courtyard 430 with stairwells in the corners. APs, including the AP 410, were located in each of the four corners (including a northeast corner 440 and a southwest corner 450). RSS measurements from 30 fixed positions that are roughly uniformly spaced over the region of interest (ignoring the courtyard 430, for example) will be used for training. It has been found that using more training positions is costly and has little effect on the quality of position estimation.

Again, FIGS. 4A and 4B show the estimated signal strength MAD maps based on all the measurements for the 30 training positions for the AP 410 and an interpolation grid size of 0.25 m. (The mean and standard deviation maps for the other APs are similar, with obvious rotations that depend on the position of the AP.) As would be expected, the mean signal strength diminishes from about −50 dB to about −90 dB (apparently, the limit of detection) with distance from the AP. Surprisingly, the mean signal strength falls off with the square root of distance in both the corridors and offices, with an additional constant penalty for positions in offices. This assumption does not hold with respect to all APs "behind the courtyard wall," however, so it will not be used.

The most prominent features of the standard deviation maps are the hills in each corner. For the AP 410, the standard deviation is highest in the northeast corner 440 and lowest in the southwest corner 450, probably because the signal in the southwest corner 450 is weak and bounded below by −90 dB. Over the entire space, the estimated standard deviation ranges from 1 dB to 5 dB, with a mean and median standard deviation over the region of about 2.8 dB and 3.0 dB respectively.

First, the mean and standard deviation maps of FIGS. 4A and 4B are used to estimate all 88 positions using an arbitrary subset of ten RSS measurements from each AP for each position. Thus, the standard error at any point in the empirical signal strength mean map is about $2.8/\sqrt{10} \sim 0.95$. Because the grid size is 0.25 m, equation (1) gives k~22. Thus, position is estimated with a Gaussian weighted average of the 25 nearest neighboring grid points.

Figure 5:
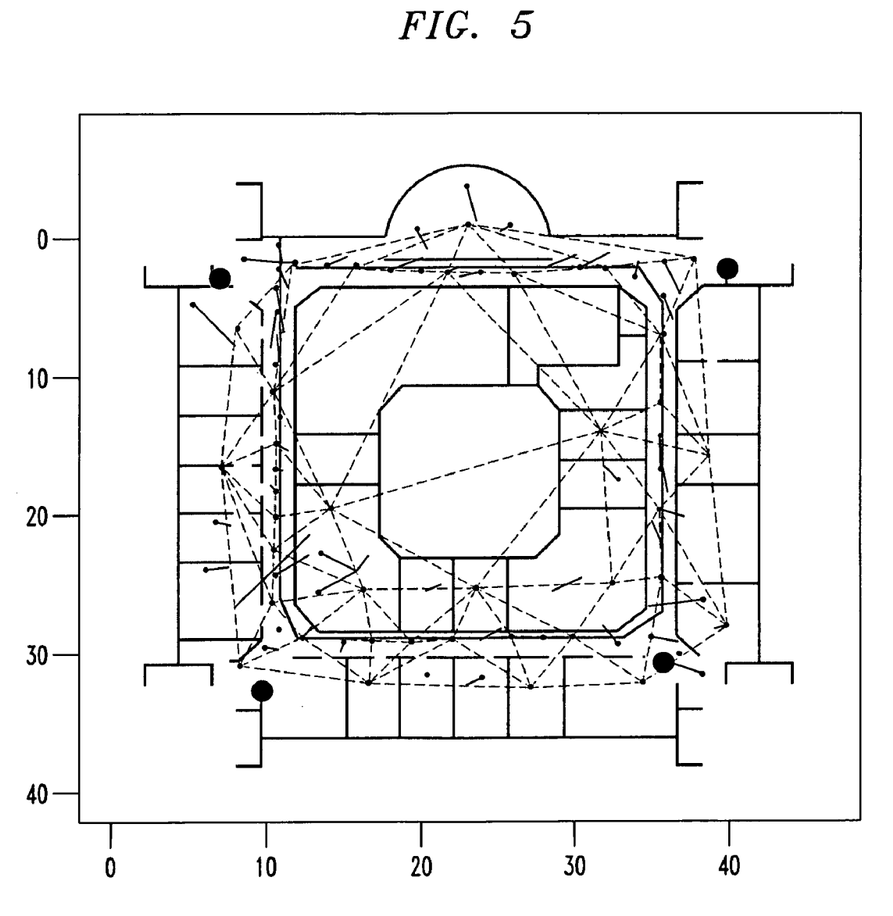
FIG. 5 illustrates an exemplary graphical representation of errors in position estimates for an experiment with the mean and standard deviation maps of FIGS. 4A and 4B.

Turning now to FIG. 5, illustrated is an exemplary graphical representation of errors in position estimates for an experiment with the mean and standard deviation maps shown in FIGS. 4A and 4B. The maps were based on 100 measurements at each of the 30 training positions; positions were estimated from ten randomly chosen RSS measurements from each position. The circles at the end of the line show the true position; the other end of the line denotes the estimated position. The errors are generally small, except outside the convex hull of the training positions. Moreover, the errors are generally larger along the north-south corridors (not referenced) than they are along the east-west corridors (also not referenced). The errors also tend to be larger in the corners, i.e., very close to the APs. The 0.1, 0.5 and 0.9 quartiles of the errors are 0.35 m, 0.96 m and 2.86 m respectively. Similar maps are obtained for other trials under the same conditions (ten RSS measurements from each position to be estimated).

Figure 6:
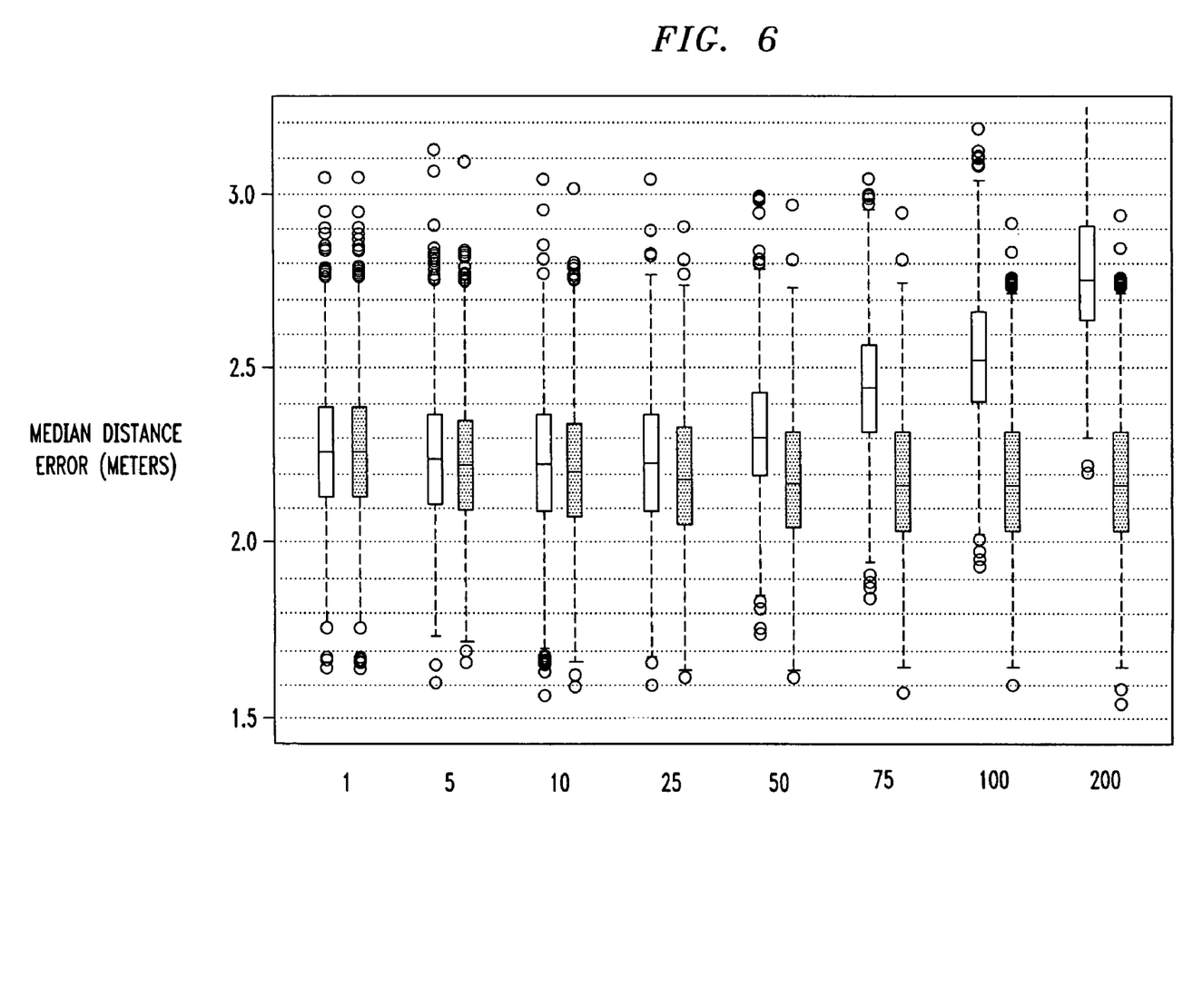
FIG. 6 illustrates an exemplary graphical representation of a simulated distribution of median position error over a region with a training set of 100 RSS measurements from each of 30 positions and each of the 88 positions estimated from one randomly chosen RSS measurement from the position.

Turning now to FIG. 6, illustrated is an exemplary graphical representation of a simulated distribution of median position error over the region with a training set of 100 RSS measurements from each of 30 positions and each of the 88 positions estimated from one randomly chosen RSS measurement from the position. The white boxplots are for uniform weights; the gray boxplots are for Gaussian weights with means and standard deviations taken from the empirical mean and standard deviation maps. Each pair of boxplots represents a different number k of nearest neighboring grid points. The effect of using Gaussian weights rather than uniform weights can be seen in FIG. 6. There, static position estimates for the 88 positions are based on one randomly selected RSS measurement from each position, using the training maps shown in FIGS. 4A and 4B. The optimal number of nearest neighboring grid points k from equation (1) is now 220, or roughly 200. In FIG. 6, the boxplots are based on computing the median error over the map for 1000 replications of this experiment. In FIG. 6, the boxes show the 0.25, 0.5 and 0.75 quantiles, the open circles show outliers, and the dashed lines show the tails of the data without the outliers. As would be expected, Gaussian weights are not much better than uniform weights if k is small; but their importance increases with k. There is about a 5% reduction in the average median error for k=200 and Gaussian weights. Note that the difference between using k=1 and k=5 is negligible, with or without weights.

Now, the performance of an exemplary embodiment of the dynamic tracking algorithm will be analyzed for the sample wifi data (RSS measurements and positions) using the training maps of FIGS. 4A and 4B. However, the issue of whether the training maps are appropriate for the tracking data should first be evaluated.

The tracking data were collected days after the training data, and the signal strength map(s) might have changed in the interim. In fact, comparing the mean observed RSS in the tracking experiments with the mean observed RSS in the training data, shows that adjusting the RSS measurements for APs 1, 2, 3 and 4 by 1 dB, 1.5 dB, 1.5 dB and 1 dB respectively corrects for the average drift in the mean. More generally, drift in calibration could be evaluated using data routinely collected from known positions, as proposed in, e.g., Krishnan, et al., supra.

FIG. 5 shows the results of applying our tracking algorithm to the sample wifi data with k=100 nearest neighboring grid points and a moving average of m=8 past and current measurements. The 0.1, 0.5, and 0.9 error quartiles over the map are 0.3 m, 1.3 m and 2.5 m respectively for the moving average estimates; the values after smoothing are 0.5 m, 1.4 m and 2.6 m. Thus, smoothing in this case does not reduce errors, but the smooth path has fewer wall crossings and unrealistic jumps.

Figure 7A:
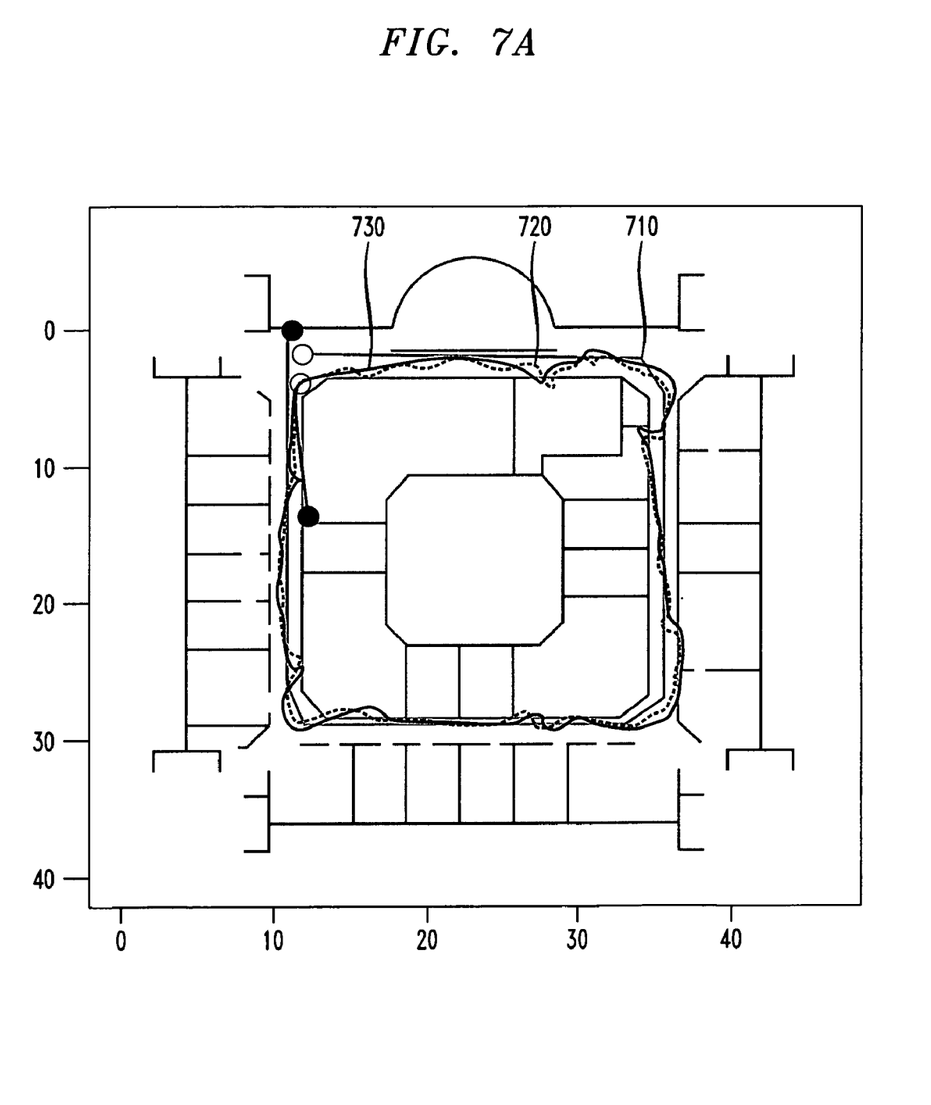
FIG. 7A illustrates an exemplary graphical representation of a true path, position estimates based on the moving average, and smoothed, tracking estimates.
Figure 7B:
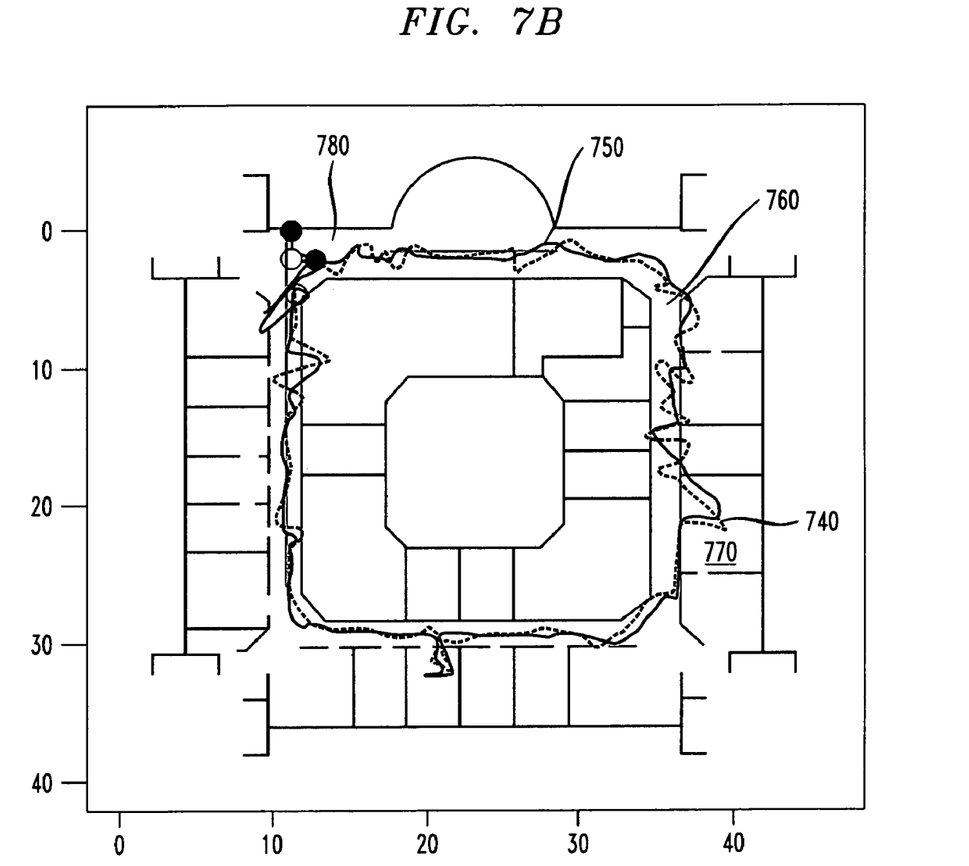
FIG. 7B illustrates an exemplary graphical representation of an estimated path using a moving average with a span of eight followed by loess smoothing with a span of 40.

Finally, simulated paths are constructed by fixing the positions along an actual path and simulating RSS measurements by sampling from normal distributions with means and standard deviations determined by the empirical RSS maps. Accordingly, turning now to FIGS. 7A and 7B, illustrated are exemplary graphical representations of true and estimated paths. FIG. 7A shows a true path (a light gray line 710), position estimates based on the moving average (a dotted black line 720), and smoothed, tracking estimates (a solid black line 730). The filled circles denote the start of the path; the open circles denote the end of the path. FIG. 7B shows an estimated path using a moving average with a span of 8 (a dotted black line 740) followed by loess with a span of 40 (a solid black line 750) and the true path (a light gray line 760) shadowed by the estimated path, which goes into one room 770 off the corridor.

The same training data used in FIGS. 4A and 4B were used in FIGS. 7A and 7B. Here the 0.1, 0.5 and 0.9 quartiles of position error are 0.27 m, 0.9 m and 1.8 m respectively after the moving average step. After smoothing the path, the 0.1, 0.5 and 0.9 quartile errors are 0.4 m, 0.8 m and 1.8 m, and the paths are again more realistic.

Table 1, below is a table of averages (over 100 replications) of median error using simulated RSS measurements along the true path in FIG. 7A as a function of the number of nearest neighboring grid points k, the number m of past and current RSS measurements in the moving average, and whether zero or one subsequent RSS measurements were used in the moving average. Table 1 shows the effect of using k nearest neighboring grid points and a moving average over m−1 past RSS measurements, the current measurement, and either no or one subsequent measurement. Table 1 reports median error over the path, averaged over 100 simulated paths. As would be expected, using one subsequent (t=n+1) RSS measurement to estimate position at time n reduces the median error along the path noticeably (by about 10%). Moreover, with one subsequent RSS measurement, the optimal choices appear to be obtained with an average window of m=8 and k=25 nearest neighboring grid points. Equation (1) suggests $k=\pi 0.75^2 \hat{\sigma}^2/ \tfrac{5}{16} \approx 28$ in this case, which is quite close to simulated optimum for both the no-subsequent-measurement and one-subsequent-measurement cases in the table.

TABLE 1

Averages of Median Error Using Simulated RSS Measurements

| m | \multicolumn{8}{c}{k} |
|---|---|---|---|---|---|---|---|---|
|   | 1 | 5 | 10 | 25 | 50 | 100 | 200 | 500 |
| \multicolumn{9}{c}{No Subsequent Measurement} |
| 1 | 2.02 | 1.99 | 1.97 | 1.94 | 1.91 | 1.87 | 1.83 | 1.82 |
| 2 | 1.45 | 1.43 | 1.41 | 1.39 | 1.36 | 1.35 | 1.34 | 1.33 |
| 4 | 1.06 | 1.04 | 1.03 | 1.01 | 1.00 | 0.99 | 0.99 | 0.99 |
| 6 | 0.93 | 0.91 | 0.90 | 0.89 | 0.88 | 0.88 | 0.88 | 0.88 |
| 8 | 0.91 | 0.89 | 0.88 | 0.87 | 0.87 | 0.87 | 0.87 | 0.86 |
| 10 | 0.95 | 0.93 | 0.92 | 0.92 | 0.91 | 0.91 | 0.91 | 0.91 |
| 12 | 1.04 | 1.02 | 1.01 | 1.00 | 1.00 | 1.00 | 1.00 | 1.00 |
| \multicolumn{9}{c}{One Subsequent Measurement} |
| 1 | 2.02 | 1.99 | 1.97 | 1.94 | 1.91 | 1.87 | 1.83 | 1.82 |
| 2 | 1.46 | 1.43 | 1.41 | 1.39 | 1.36 | 1.35 | 1.34 | 1.33 |
| 4 | 1.05 | 1.02 | 1.01 | 0.99 | 0.98 | 0.97 | 0.97 | 0.97 |
| 6 | 0.89 | 0.87 | 0.86 | 0.85 | 0.84 | 0.83 | 0.83 | 0.83 |
| 8 | 0.85 | 0.82 | 0.81 | 0.80 | 0.80 | 0.79 | 0.79 | 0.79 |
| 10 | 0.86 | 0.84 | 0.83 | 0.82 | 0.82 | 0.82 | 0.82 | 0.82 |
| 12 | 0.92 | 0.90 | 0.89 | 0.89 | 0.88 | 0.88 | 0.88 | 0.88 |

Although the present invention has been described in detail, those skilled in the pertinent art should understand that they can make various changes, substitutions and alterations herein without departing from the spirit and scope of the invention in its broadest form.

What is claimed is:

1. A system for position estimation of an object relative to a region, comprising:
 a map generator configured to create a mean map for said region, wherein said mean map includes grid points that are based on multiple radio transceivers associated with said region; and
 a measurement matching engine associated with said map generator and configured to match received measurements regarding said object to a plurality of nearest neighboring of said grid points in said mean map.

2. The system as recited in claim 1 wherein said map generator is further configured to create a standard deviation map for said region and said measurement matching engine is further configured to employ said standard deviation map to weight an average of said plurality of nearest neighboring grid points.

3. The system as recited in claim 1 wherein said mean map is a signal strength mean map.

4. The system as recited in claim 2 wherein said standard deviation map is a signal strength standard deviation map.

5. The system as recited in claim 1 wherein said nearest neighboring grid points are determined by generating vectors from moving averages of test measurements and determining distances between said vectors.

6. The system as recited in claim 1 further comprising a path smoother associated with said measurement matching engine and configured to make smooth static position estimates regarding said object.

7. The system as recited in claim 1 wherein said map generator is configured to create said mean map by interpolating sample means over a triangular partition of a given area, ignoring height.

8. The system as recited in claim 7 wherein said map generator is configured to create said mean map by linearly interpolating said sample means.

9. The system as recited in claim 2 wherein said map generator is configured to create said standard deviation map by interpolating an estimate of standard deviation over a partition of a given area, ignoring height.

10. The system as recited in claim 9 wherein said map generator is configured to create said standard deviation map by linearly interpolating said estimate of said standard deviation.

11. The system as recited in claim 1 wherein a mean signal strength at each of said grid points is determined by interpolation of each said radio transceiver.

12. The system as recited in claim 1 wherein a vector is associated with each of said grid points with each said vector having a same number of components equal to a number of said radio transceivers.

13. The system as recited in claim 1 wherein said map generator is configured to create said mean map without requiring a propagation model.

14. The system as recited in claim 2 wherein said map generator is configured to create said standard deviation map without requiring a propagation model.

15. The system as recited in claim 6 wherein said path smoother is configured to make said smooth static position estimates regarding said object without requiring a motion model.

16. A system for position estimation of an object relative to a region, comprising:
- a map generator configured to create, without requiring a propagation model, a mean map for said region;
- a measurement matching engine associated with said map generator and configured to match received measurements regarding said object to a plurality of nearest neighboring grid points in said mean map; and
- a path smoother associated with said measurement matching engine and configured to make smooth static position estimates regarding said object without requiring a motion model and further configured to locally linearly smooth a moving window of said static position estimates.

* * * * *